US012651812B2

(12) United States Patent　　　(10) Patent No.:　US 12,651,812 B2
Pak et al.　　　　　　　　　　　(45) Date of Patent:　　Jun. 9, 2026

(54) BATTERY ASSEMBLY AND BATTERY PACK HAVING THE SAME

(71) Applicant: SK ON CO., LTD., Seoul (KR)

(72) Inventors: Byeong Jun Pak, Daejeon (KR); Min Song Kang, Daejeon (KR); Bon Seok Ku, Daejeon (KR); Jun Hee Jung, Daejeon (KR); Sei Hoon Cho, Daejeon (KR); Jin Su Han, Daejeon (KR); Jae Il Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 944 days.

(21) Appl. No.: 17/931,060

(22) Filed: Sep. 9, 2022

(65) Prior Publication Data

US 2023/0082883 A1　　Mar. 16, 2023

(30) Foreign Application Priority Data

Sep. 10, 2021　(KR) ........................ 10-2021-0121187

(51) Int. Cl.
| | |
|---|---|
| *H01M 50/569* | (2021.01) |
| *H01M 10/42* | (2006.01) |
| *H01M 10/48* | (2006.01) |
| *H01M 50/211* | (2021.01) |
| *H01M 50/258* | (2021.01) |
| *H01M 50/264* | (2021.01) |
| *H01M 50/507* | (2021.01) |

(Continued)

(52) U.S. Cl.
CPC ....... *H01M 50/569* (2021.01); *H01M 10/425* (2013.01); *H01M 10/482* (2013.01); *H01M 50/211* (2021.01); *H01M 50/258* (2021.01);

*H01M 50/264* (2021.01); *H01M 50/507* (2021.01); *H01M 50/519* (2021.01); *H01M 50/548* (2021.01)

(58) Field of Classification Search
CPC .................................................. H01M 50/569
See application file for complete search history.

(56) References Cited

U.S. PATENT DOCUMENTS

| | | | |
|---|---|---|---|
| 2010/0136422 A1* | 6/2010 | Koh .................... | H01M 10/486 |
| | | | 429/178 |
| 2015/0064541 A1 | 3/2015 | Noh et al. | |
| 2017/0214012 A1 | 7/2017 | Benedict et al. | |

(Continued)

FOREIGN PATENT DOCUMENTS

| | | |
|---|---|---|
| EP | 4016662 A1 | 6/2022 |
| EP | 4040580 A1 | 8/2022 |

(Continued)

OTHER PUBLICATIONS

Extended European Search Report for European Patent Application No. 22194367.3, mailed Feb. 3, 2023 (10 pages).

*Primary Examiner* — Brian R Ohara
(74) *Attorney, Agent, or Firm* — Perkins Coie LLP

(57) ABSTRACT

A battery assembly includes a cell stack including a plurality of battery cells stacked together, a busbar assembly coupled to the cell stack and including a busbar electrically connected to an electrode lead of at least one of the battery cells, a plate unit configured to cover at least a portion of a side surface of the cell stack, a sensing unit coupled to the busbar assembly and disposed outside of the cell stack, and a cell monitoring unit installed on the plate unit and coupled to the sensing unit.

16 Claims, 9 Drawing Sheets

(51) Int. Cl.
　　H01M 50/519 　　(2021.01)
　　H01M 50/548 　　(2021.01)

(56) References Cited

U.S. PATENT DOCUMENTS

| | | | |
|---|---|---|---|
| 2017/0237053 A1* | 8/2017 | Sugawara | H01M 50/204 |
| | | | 429/159 |
| 2018/0194235 A1 | 7/2018 | Kim et al. | |
| 2020/0411924 A1* | 12/2020 | Yun | H01M 50/298 |
| 2021/0020891 A1 | 1/2021 | Min et al. | |
| 2021/0164511 A1 | 6/2021 | Jeong et al. | |

FOREIGN PATENT DOCUMENTS

| | | |
|---|---|---|
| JP | 6293906 B2 | 3/2018 |
| KR | 10-2007-0075709 A | 7/2007 |
| KR | 20150024724 A | 3/2015 |
| KR | 102034208 B1 | 10/2019 |
| KR | 10-2020-0080078 A | 7/2020 |
| KR | 20210041950 A | 4/2021 |
| WO | 2021/056990 A1 | 4/2021 |

* cited by examiner

'A'

BATTERY ASSEMBLY AND BATTERY PACK HAVING THE SAME

CROSS-REFERENCE TO RELATED APPLICATION

This application claims the benefit under 35 USC 119(a) of Korean Patent Application No. 10-2021-0121187 filed in the Korean Intellectual Property Office on Sep. 10, 2021, the entire disclosure of which is incorporated herein by reference in its entirety for all purposes.

TECHNICAL FIELD

The present disclosure relates to a battery assembly including a cell stack in which a plurality of battery cells are stacked, and a battery pack having the same.

BACKGROUND

Unlike primary batteries, secondary batteries may be charged and discharged, and therefore, may be applied to various devices such as digital cameras, mobile phones, notebook computers, hybrid vehicles, and electric vehicles. Among secondary batteries, lithium secondary batteries are being actively studied due to their high energy density and discharge voltage. The lithium secondary battery is manufactured as a pouch-type battery cell having flexibility, a prismatic or a cylindrical type battery cell having rigidity.

SUMMARY

A cell stack includes a plurality of battery cells electrically connected to each other. The cell stack is accommodated in a module housing to form a battery module, and a pack housing includes a plurality of battery modules accommodated therein to form a battery pack, which can be installed and used in an electric vehicle or others.

Each battery module accommodated in the battery pack includes a sensing unit to measure the voltage or temperature of the battery cells accommodated therein. The sensing unit includes a voltage sensing terminal, a temperature sensor, and a circuit member such as a wire for connecting the voltage sensing terminal or the temperature sensor. The battery module based on some implementations is provided with a separate insulating plate formed of a plastic injection molding to support and install the wire, and the insulation between the wire and the battery cell is implemented through the insulating plate. For this reason, the installation structure of the sensing unit in such a battery module is complicated and the overall volume is increased.

In addition, the sensing unit provided in the battery module is coupled to a cell monitoring unit (CMU), and the cell monitoring unit measures the temperature, voltage, and chemical state of the battery module and transmits the measured results to the Battery Management System (BMS). In the battery pack based on some implementations, the cell monitoring unit is spaced apart from the battery module and installed in a separate space provided inside the pack housing, and therefore, the space utilization inside the pack housing may deteriorate, and the energy density of the battery pack may deteriorate.

The battery pack based on some implementations accommodates a plurality of battery modules. Since each battery module has a shape covering the entire exterior surface including the upper and lower surfaces of the cell stack and the space occupied by the battery module inside the pack housing thus increases, energy density may deteriorate.

The disclosed technology can be implemented in some embodiments to provide a battery assembly and a battery pack having the battery assembly that can improve space utilization and energy density when assembled as a battery pack.

The disclosed technology can be implemented in some embodiments to provide a battery assembly in which installation of a sensing member may be facilitated and insulation between the sensing member and a battery cell may be secured, and a battery pack having the battery assembly.

According to an aspect of the present disclosure, a battery assembly can include a cell stack in which a plurality of battery cells are stacked; a busbar assembly provided with a busbar electrically connected to an electrode lead of the battery cell, and coupled to the cell stack; a plate unit configured to cover at least a portion of a side surface of the cell stack; a sensing unit coupled to the busbar assembly and disposed outside of the cell stack; and a cell monitoring unit coupled to the sensing unit. The cell monitoring unit is installed on the plate unit.

The sensing unit may include a circuit member disposed on one surface of the cell stack, and an insulating member coupled to the circuit member to insulate between the circuit member and the cell stack. The circuit member may include a flexible printed circuit board (FPCB), and the insulating member may include an insulating film or an insulating pad on which the flexible printed circuit board is installed.

The sensing unit may further include a sensor installed on an extension portion extending from the circuit member toward the busbar. In this case, the busbar assembly may further include an insulating support plate on which the busbar is installed, and an installation groove through which the extension portion passes may be disposed in the support plate.

At least a portion of the cell stack and the sensing unit may be exposed to an outside of the plate unit.

The plate unit may include a first plate covering the cell stack in a longitudinal direction of the battery cell, and a second plate covering the cell stack in a stacking direction of the battery cell. The plate unit may have a shape, surrounding four side surfaces of the cell stack and in which at least a portion of an upper surface and at least a portion of a lower surface of the cell stack are exposed externally.

The busbar assembly may be disposed between the first plate and the cell stack.

The battery cell may be formed of a pouch-type secondary battery provided with the electrode lead on both ends of the battery cell in the longitudinal direction, and the busbar assembly may be disposed on both ends of the battery cell in the longitudinal direction.

The battery assembly may further include a bracket member coupled to an exterior surface of the plate unit.

According to an aspect of the present disclosure, a battery pack can include a pack housing; and a plurality of battery assemblies accommodated in the pack housing. The battery assembly includes a cell stack in which a plurality of battery cells are stacked, a busbar assembly having a busbar electrically connected to the battery cell and coupled to the cell stack, a plate unit configured to cover at least a portion of a side surface of the cell stack, a sensing unit coupled to the busbar assembly and disposed outside of the cell stack, a cell monitoring unit coupled to the sensing unit and installed on the plate unit, and a bracket member coupled to an exterior surface of the plate unit, and the battery assembly is fixed to the pack housing by the bracket member.

The plate unit may include a first plate covering the cell stack in a longitudinal direction of the battery cell, and the bracket member may be coupled to an exterior surface of the first plate.

The pack housing may include a bottom portion, a sidewall portion extending upwardly from the bottom portion, and a cover portion covering a space formed by the bottom portion and the sidewall portion, and the bracket member may include a support plate facing the first plate, and an upper flange portion provided on an upper end of the support plate. The upper flange portion may be fastened to the side wall portion.

The bracket member may be provided with a lower flange portion provided on a lower end of the support plate, and the lower flange portion may be fixed to the bottom portion.

The bracket member may be provided with a lower flange portion provided on a lower end of the support plate, and the lower flange portion may extend in a direction of the cell stack to support a portion of a lower surface of the cell stack.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
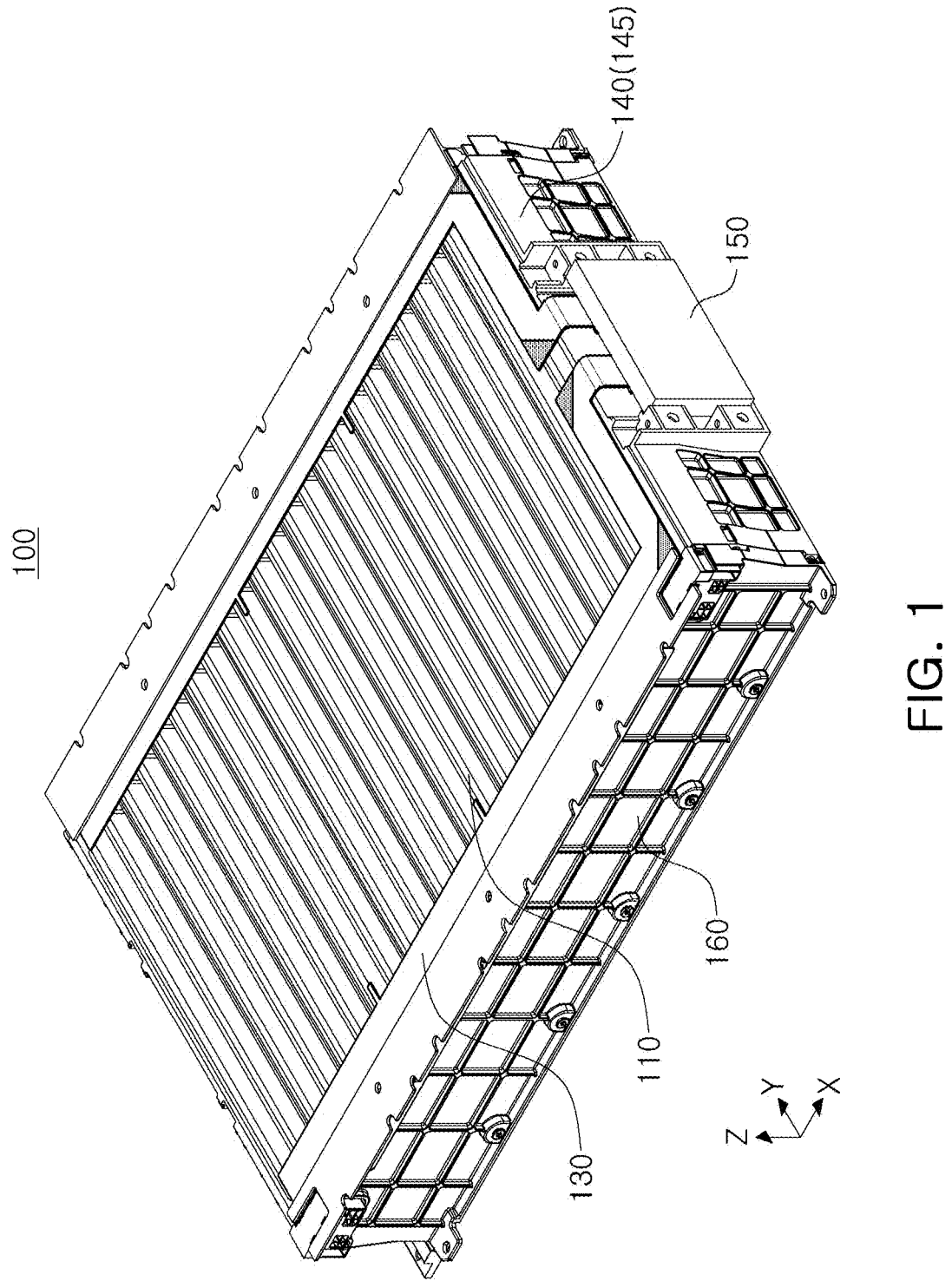
FIG. 1 is a perspective view of a battery assembly according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art.

The features described herein may be embodied in different forms, and are not to be construed as being limited to the examples described herein. Rather, the examples described herein have been provided and thus, this disclosure will be thorough and complete, and will fully convey the scope of the disclosure to one of ordinary skill in the art.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

First, a battery assembly 100 according to an embodiment will be described with reference to FIGS. 1 to 3.

Figure 2:
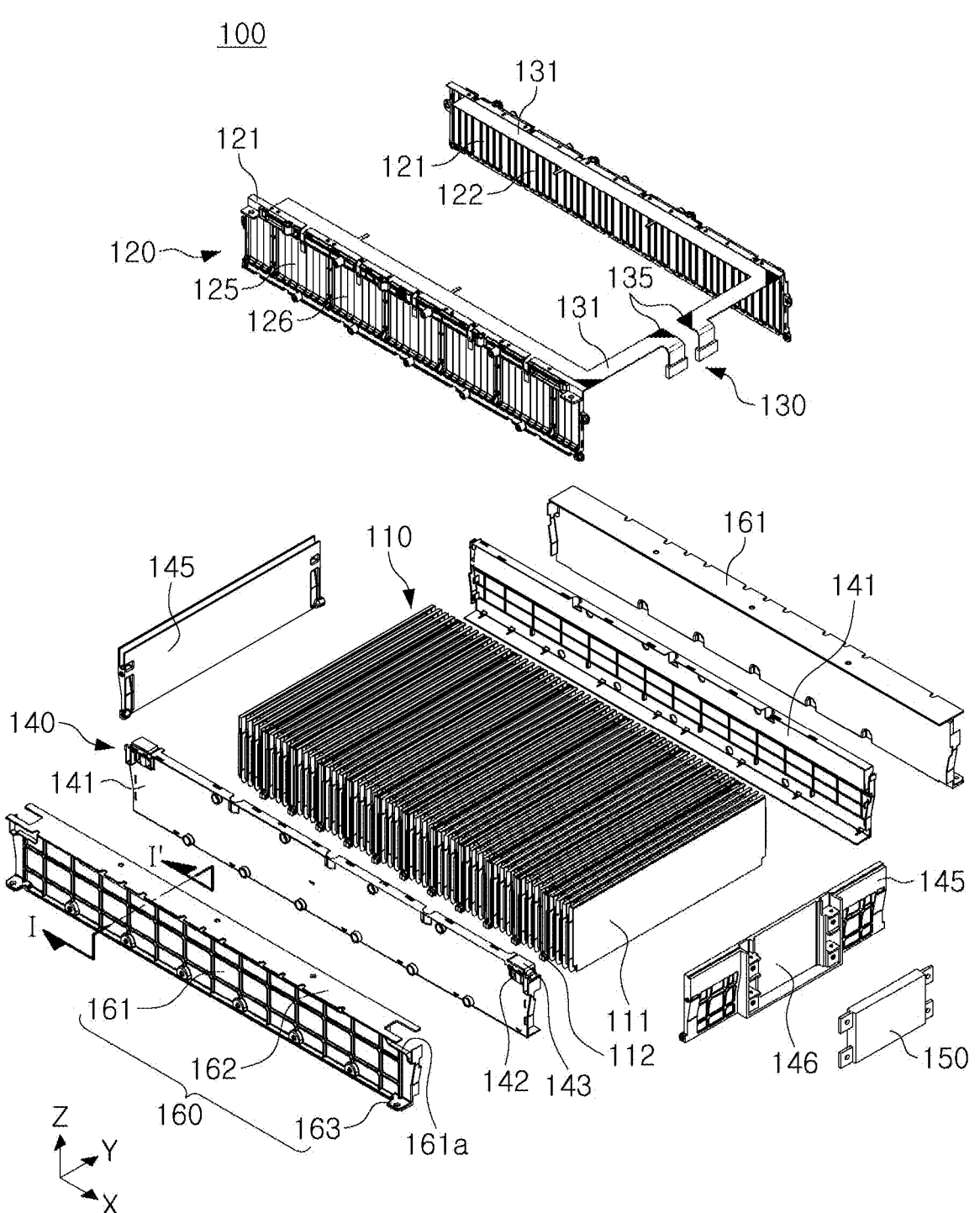
FIG. 2 is an exploded perspective view of the battery assembly illustrated in FIG. 1.
Figure 3:
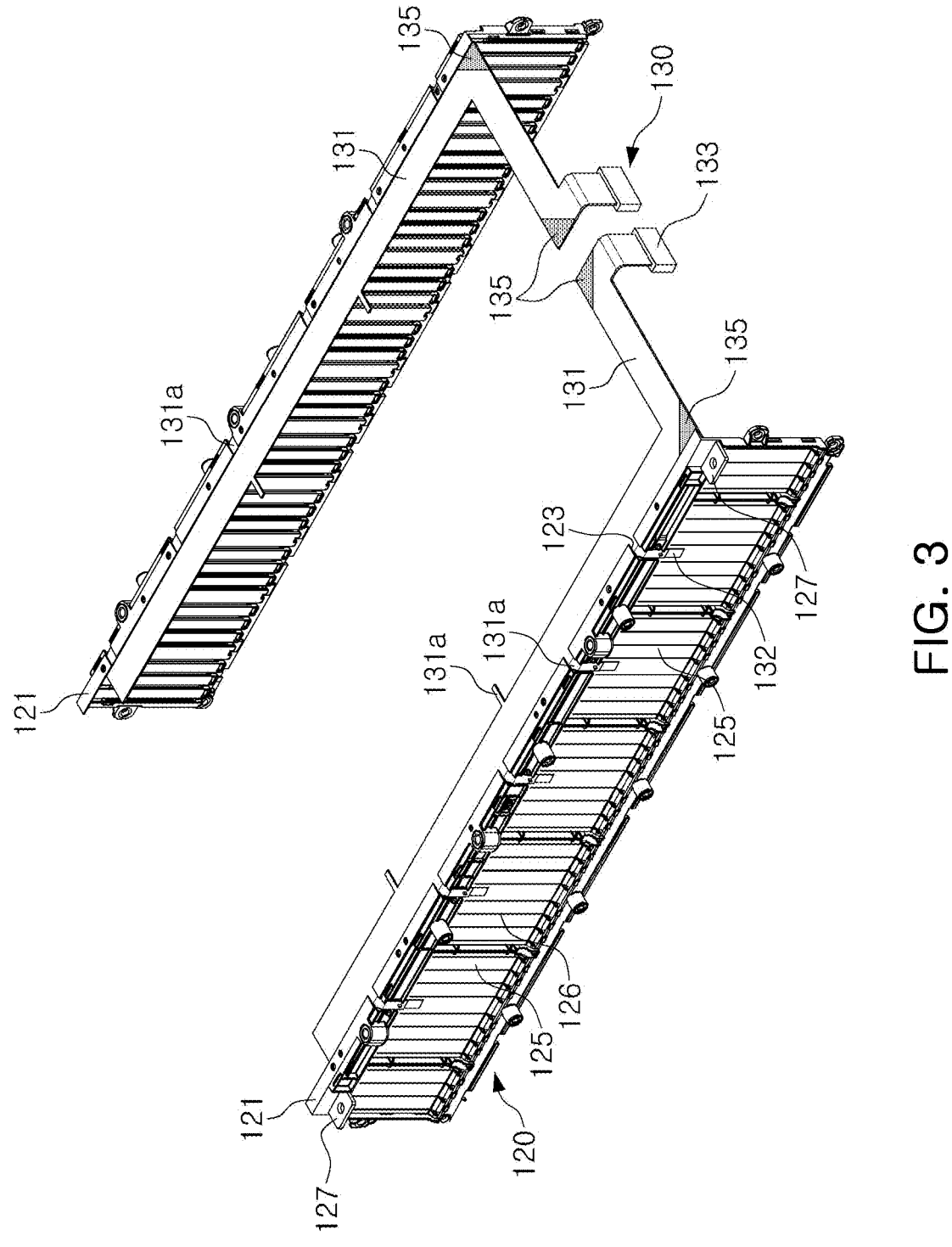
FIG. 3 is a perspective view illustrating a state in which a busbar assembly and a sensing unit illustrated in FIG. 2 are coupled.

FIG. 1 is a perspective view of the battery assembly 100 according to an embodiment, FIG. 2 is an exploded perspective view of the battery assembly 100 illustrated in FIG. 1, and FIG. 3 is a perspective view illustrating a state in which a busbar assembly 120 and a sensing unit 130 illustrated in FIG. 2 are combined.

Referring to FIGS. 1 to 3, the battery assembly 100 according to an embodiment may include a cell stack 110 in which a plurality of battery cells 111 are stacked, the busbar assembly 120 coupled to the cell stack 110, a plate unit 140 configured to cover at least a portion of a side surface of the cell stack 110, the sensing unit 130 connected to the busbar assembly 120, and a cell monitoring unit 150. In addition, the battery assembly 100 according to an embodiment may include a bracket member 160 coupled to the exterior surface of the plate unit 140.

The cell stack 110 forms a state in which the plurality of battery cells 111 are stacked. The battery cells 111 are stacked in such a manner that relatively wide surfaces are in contact with each other, and the neighboring battery cells 111 may be fixed through double-sided tape. The cell stacks 110 may be stacked in the horizontal direction (X) while the wide surfaces of the battery cells 111 are in contact, but the stacking direction is not limited thereto.

The battery cells 111 provided in the cell stack 110 may be formed of a pouch-type secondary battery. The battery cell 111 formed of a pouch-type secondary battery may be configured in a form in which an electrode assembly and an electrolyte are accommodated in a casing (pouch). The electrode assembly may be configured in a form in which the positive and negative electrode plates are stacked with a separator interposed therebetween while the wide surfaces of the positive and negative plates face each other. An electrode tab is connected to the positive electrode plate and the negative electrode plate, respectively, and the electrode tabs having the same polarity are connected to electrode leads 112 to be exposed to the outside of the casing. The electrode leads 112 may be respectively disposed one both ends of the battery cell 111 in the longitudinal direction (Y), or a plurality of electrode leads 112 may also be located with different heights from each other on one end of the battery cell 111.

The battery cell 111 may be formed of a lithium ion (Li-ion) battery or nickel metal hydride (Ni-MH) battery capable of charging and discharging. In the above description, although a case in which a pouch-type secondary battery is used as the battery cell 111 is described as an example, the battery cell 111 provided in the battery assembly 100 in an embodiment is not limited to the aforementioned pouch-type secondary battery, and for example, may also be configured as a can-type secondary battery. The can-type secondary battery may have a rectangular cross-section to be stacked to form the cell stack 110.

The busbar assembly 120 may include a busbar 125 electrically connected to the electrode lead 112 of the battery cell 111, and may be coupled to the cell stack 110. The busbar 125 is formed of an electrically conductive material to implement a series and parallel electrical connection structure of the battery cells 111. The electrode lead 112 may be exposed to the outside of the busbar 125 through a coupling hole 126 formed by penetrating through the busbar 125. The electrode lead 112 may be welded to the busbar 125 while passing through the coupling hole 126. When the electrode leads 112 of the battery cell 111 are disposed on both ends of the battery cell 111 in the longitudinal direction (Y), the busbar assembly 120 may be disposed on both ends of the battery cell 111 in the longitudinal direction (Y).

The busbar assembly 120 may include an insulating support plate 121 on which the busbar 125 is supported and installed, for insulation between busbars 125. The insulating support plate 121 may be positioned between the busbar 125 and the battery cell 111 for insulation between the busbar 125 and the battery cell 111. The support plate 121 may have a through-hole 122 through which the electrode lead 112 may pass. The electrode lead 112 may be coupled to the coupling hole 126 of the busbar 125 while passing through the through-hole 122 of the insulating support plate 121, and the busbar assembly 120 may have a state coupled to the cell stack 110.

The plate unit 140 is configured to cover at least a portion of the side surface of the cell stack 110 to protect the side surface of the cell stack 110 from the outside. The plate unit 140 surrounds four side surfaces of the cell stack 110, and may have a shape such that at least a portion of an upper surface and at least a portion of a lower surface of the cell stack 110 are exposed externally. Also, as will be described later, at least a portion of the sensing unit 130 may have a structure exposed to the outside of the plate unit 140.

As an example, the plate unit 140 may be provided with a first plate 141 covering the cell stack 110 in the longitudinal direction Y of the battery cell 111, and a second plate 145 covering the cell stack 110 in the stacking direction X of the battery cells 111. In this case, the busbar assembly 120 may be positioned between the first plate 141 and the cell stack 110. Accordingly, the first plate 141 may serve to protect the busbar assembly 120. Although not illustrated in detail, at least portions of the first plate 141 and the second plate 145, the first plate 141 and the busbar assembly 120, and the second plate 145 and the busbar assembly 120, may be fastened to each other by known fastening means such as bolts. The second plate 145 may be configured to be coupled to the busbar assembly 120 to maintain a gap (e.g., a gap in the Y direction) between the cell stack 110 and the busbar assembly 120, and accordingly, a stable coupling between the electrode lead 112 of the battery cell 111 and the busbar 125 may be maintained. For fastening between the first plate 141, the second plate 145 and the busbar assembly 120, the first plate 141, the second plate 145, and the busbar assembly 120 may have assembly holes (reference numerals not provided) for fastening or penetrating the fastening means. In this manner, by the coupling between the cell stack 110 and the busbar assembly 120 and mutual coupling of the first plate 141, the second plate 145 and/or the busbar assembly 120, the battery assembly 100 may maintain an overall coupled state.

However, the plate unit 140 is configured to cover side surfaces (both side surfaces of the cell stack 110 in the X direction in FIG. 2) of the cell stack 110, on which the busbar assembly 120 is not provided, and may not be installed on side surfaces (both side surfaces of the cell stack 110 in the Y direction in FIG. 2) on which the busbar assembly 120 is provided. In this case, among the four side surfaces of the cell stack 110, two side surfaces of the battery cells 111 in the stacking direction X have a structure covered by the plate unit 140, and two side surfaces of the battery cell 111 in the longitudinal direction Y may have a structure covered by the busbar assembly 120. For example, in an embodiment, it may be modified to have a structure in which the four side surfaces of the cell stack 110 are protected by being surrounded by the plate unit 140 and the busbar assembly 120.

On the hand other, a vent hole 142 may be formed in the first plate 141 to discharge gas, flames, combustion material, or the like discharged from the battery cell 111 outwardly of the cell stack 110. In the pouch-type secondary battery, the battery cell 111 has a structure in which a sealing portion (not illustrated) is formed by sealing at least a portion of the periphery of the casing for accommodating the electrode assembly, and the sealing portion is folded to maintain sealing force. In this case, the sealing portion provided with the electrode lead 112 cannot be folded and may thus have the sealing force weaker than that of the folded portion. When an event such as temperature rise, fire, or explosion occurs in the battery cell 111, gas, flame, combustion materials, or the like may be discharged through the provided sealing portion on which the electrode lead 112 is disposed. In an embodiment, since the vent hole 142 formed in the first plate 141 is formed to face the portion to which the electrode lead 112 is connected, gas, flame, combustion materials, or the like discharged from the cell stack 110 may be quickly discharged outwardly of the cell stack 110.

In addition, the first plate 141 may be provided with a terminal connection portion 143 in which a connection terminal (127 in FIG. 3) electrically connected to the busbar 125 is installed. The terminal connection portion 143 may be installed on both ends of the battery assembly 100 in the long side direction. Accordingly, by configuring the connection path of the external busbar (not illustrated) interconnecting the battery assemblies 100 to be relatively short, the weight of the external busbar and/or reduce the installation costs thereof may be reduced.

The sensing unit 130 is provided to measure the voltage or temperature of the battery cell 111. The sensing unit 130 may include a voltage sensing terminal 132 connected to the busbar 125 to measure the voltage of the battery cell 111, and a temperature sensor (not illustrated) installed on the exterior surface (e.g., upper surface) of the battery cell 111 to measure the temperature of the battery cell 111. In addition, the sensing unit 130 may include a circuit member 131 to provide a signal received from the voltage sensing terminal 132, the temperature sensor, and the like. The circuit member 131 may be formed of a printed circuit board (PCB), but may include a flexible printed circuit board (FPCB) for ease of handling and installation, and reduction in thickness.

The circuit member 131 may be disposed on one surface of the cell stack 110, for example, an upper surface of the cell stack 110. In an embodiment, the sensing unit 130 may further include an insulating member 135 coupled to the circuit member 131 to insulate between the circuit member 131 and the cell stack 110. The insulating member 135 may include an insulating film or an insulating pad on which a flexible printed circuit board is installed.

The circuit member 131 formed of a flexible printed circuit board or a printed circuit board has a structure in which a circuit is formed on an insulating part. Since the circuit member 131 has a structure exposed to the outside of the plate unit 140, insulation may be insufficient during installation and use thereof. However, in an embodiment, after separately coupling the insulating member 135 to the circuit member 131, the insulating member 135 is positioned between the circuit member 131 and the cell stack 110, thereby improving the insulation performance of the sensing unit 130.

The voltage sensing terminal 132 is attached to the busbar 125 through welding or the like. For installation of the voltage sensing terminal 132, the sensing unit 130 may include an extension portion 131*a* extending from the circuit member 131 toward the busbar 125. The extension portion 131*a* may extend toward the busbar 125 through an installation groove formed in the insulating support plate 121, and the voltage sensing terminal 132 may be installed on an end of the extension portion 131*a*. On the other hand, the extension portion 131*a* may extend from the circuit member 131 toward the upper surface of the cell stack 110, and a temperature sensor (not illustrated) may be installed on the extension portion 131*a* extending toward the upper surface of the cell stack 110. As such, since the sensing unit 130 has a structure connected to the busbar assembly 120, handling and installation may be easy, and the insulating performance between the cell stack 110 and the circuit member 131 may be improved through the insulating member 135 formed of an insulating film or an insulating pad. In addition, compared to the related art in which an installation groove is formed in a separate insulating plate to support and install the wire, there is an advantage that the installation structure of the sensing unit 130 is relatively simple and the volume is reduced.

The cell monitoring unit 150 is connected to the sensing unit 130, and transmit the temperature and voltage measured in the battery module to a Battery Management System (BMS), based on information received from the voltage sensing terminal 132 and/or the temperature sensor, or the like. The cell monitoring unit 150 may be installed on the plate unit 140. For example, a mounting groove 146 for installation of the cell monitoring unit 150 may be formed in the second plate 145, and the cell monitoring unit 150 may be installed in the mounting groove 146 of the second plate 145 while being connected to a connector 133 of the sensing unit 130.

As such, in an embodiment, the cell monitoring unit 150 is installed directly on the plate unit 140 configured to protect the cell stack 110. Therefore, according to an embodiment of the present disclosure, the advantage that the space utilization of a battery pack (200 in FIG. 4) may increase and energy density may be improved may be obtained, compared to the related art in which the cell monitoring unit is spaced apart from the battery module and installed in a separate space provided inside the battery pack.

On the other hand, in an embodiment of the present disclosure, the battery assembly 100 may further include a bracket member 160 coupled to an exterior surface of the plate unit 140. In this case, the battery assembly 100 may be fixedly installed inside a pack housing (210 in FIG. 4) through the bracket member 160.

The bracket member 160 may be installed to correspond to all side surfaces of the cell stack 110, but may be installed in a portion of the plate unit 140 to significantly reduce the volume of the battery assembly 100 and improve assembly. As an example, the bracket member 160 may have a structure coupled to the exterior surface of the first plate 141 corresponding to the long side of the cell stack 110.

In addition, the first plate 141 is positioned between the bracket member 160 and the busbar assembly 120, and the bracket member 160 may be fastened to the busbar assembly 120. In this case, a through-hole (reference numeral not assigned) through which a fastening member such as a bolt passes may be formed in the first plate 141. For example, by the fastening of the bracket member 160 and the busbar assembly 120, the bracket member 160, the first plate 141, and the busbar assembly 120 may be integrally coupled.

The bracket member 160 may also be provided with a support plate 161 formed as a wide surface facing the first plate 141, and an upper flange portion 162 provided on the upper end of the support plate 161. Alternatively, the bracket member 160 may be provided with a lower flange portion 163 provided on the lower end of the support plate 161.

An opening 161*a* may be formed in the bracket member 160 to correspond to the vent hole 142 and/or the terminal connection portion 143 provided in the first plate 141. Accordingly, the gas, flame, and/or combustion material discharged through the vent hole 142 may be discharged to the outside of the battery assembly 100 through the opening 161*a*. Also, the terminal connection portion 143 may be exposed to the outside of the bracket member 160 through the opening 161*a*. The shape or number of the openings 161*a* may be variously changed.

Next, the battery pack 200 according to an embodiment will be described with reference to FIGS. 4 to 9. The battery pack 200 illustrated in FIGS. 4 to 9 may include the battery assembly 100 described with reference to FIGS. 1 to 3. Therefore, to avoid unnecessary duplication, the description of the battery assembly 100 is replaced with the contents described with reference to FIGS. 1 to 3, and a part related to the battery pack 200 will be mainly described.

Figure 4:
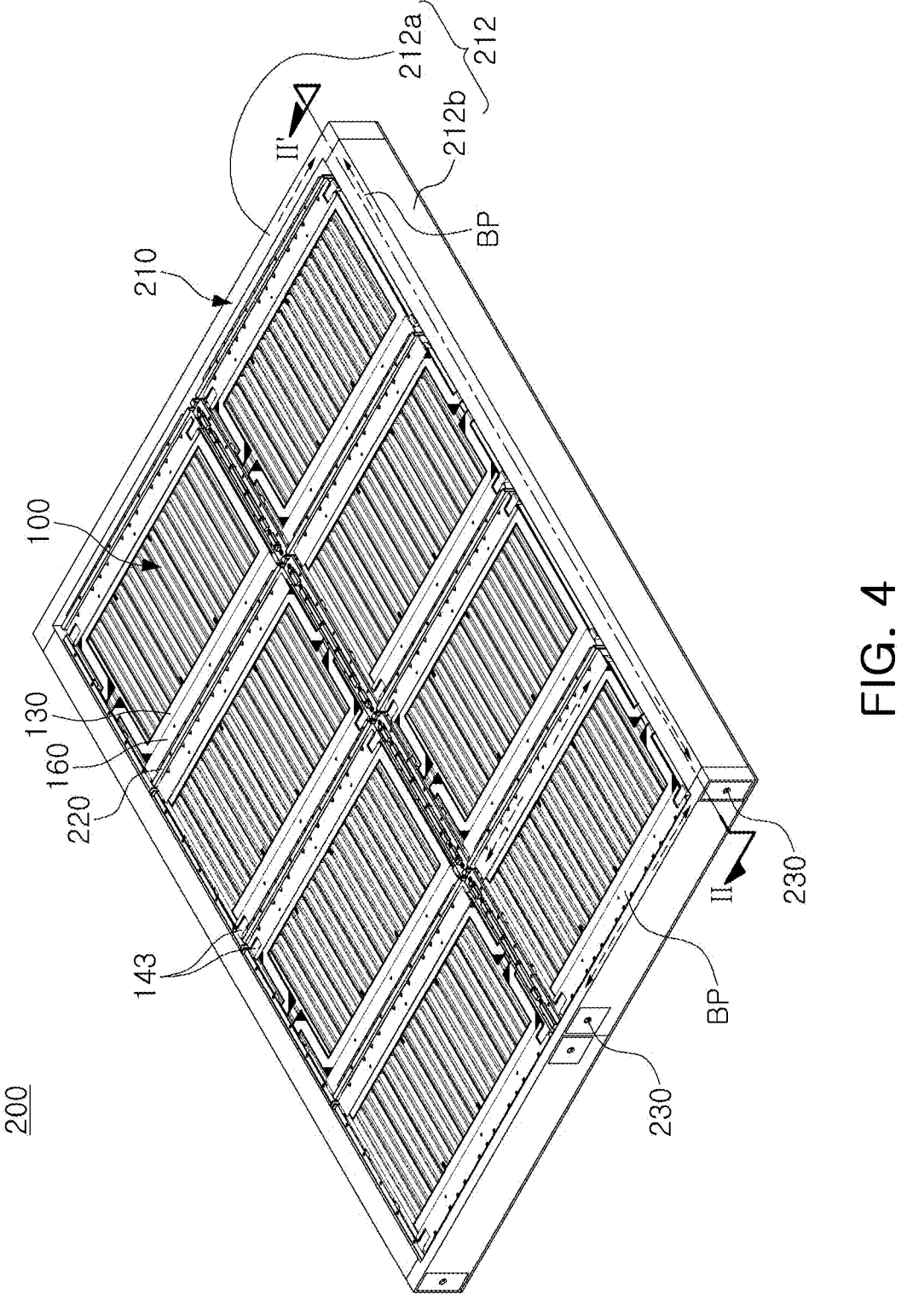
FIG. 4 is a perspective view of a battery pack having the battery assembly illustrated in FIG. 1.

FIG. 4 is a perspective view of the battery pack 200 having the battery assembly 100 illustrated in FIG. 1, and illustrates a state in which a cover portion (213 in FIGS. 7 and 8) of the pack housing 210 is omitted to check the internal structure.

Referring to FIG. 4, the battery pack 200 may include the pack housing 210 and a plurality of battery assemblies 100 accommodated in the pack housing 210.

The pack housing 210 may include a side wall portion 212. The side wall portion 212 may include first sidewalls 212*a* positioned on both ends of the pack housing 210 in the first direction, and second sidewalls 212*b* positioned on both ends of the pack housing 210 in the second direction perpendicular to the first direction. The first sidewalls 212*a* and the second sidewalls 212*b* form four exterior surfaces of the pack housing 210.

A partition member 220 may be provided inside the pack housing 210. The partition member 220 divides the space of the pack housing 210 into a plurality of spaces in which the battery assembly 100 is accommodated, respectively.

The battery assembly 100 is installed in a space partitioned by the side wall portion 212 and the partition member 220, and the sensing unit 130 may have a state in which at least a portion is exposed to the outside of the battery assembly 100. The plurality of battery assemblies 100 may be electrically connected through an external busbar (not illustrated), and the external busbar may be connected to the terminal connection portion 143 of the battery assembly 100. To shorten the connection path of the external busbar, the terminal connection portions 143 of the adjacent battery assemblies 100 may be disposed on positions corresponding to each other. Accordingly, the weight of the external busbar may be reduced and/or the installation costs may be reduced. As an example, the terminal connection portion 143 may be installed on both ends of the battery assembly 100 in the long side direction.

In the pack housing 210, a vent member 230 may be installed to discharge gas, flame, and/or combustion materials generated from the battery cells 111 constituting the cell stack 110 to the outside of the battery pack 200. The vent member 230 may have a structure that is normally closed and may be opened when gas is discharged. However, the vent member 230 may be configured as an open hole formed in the pack housing 210. A gas discharge path BP may be formed inside the pack housing 210 such that gas, flame, and/or combustion materials may move toward the vent member 230 and be discharged externally. The installation position and number of the vent member 230 may be variously changed.

Figure 5:
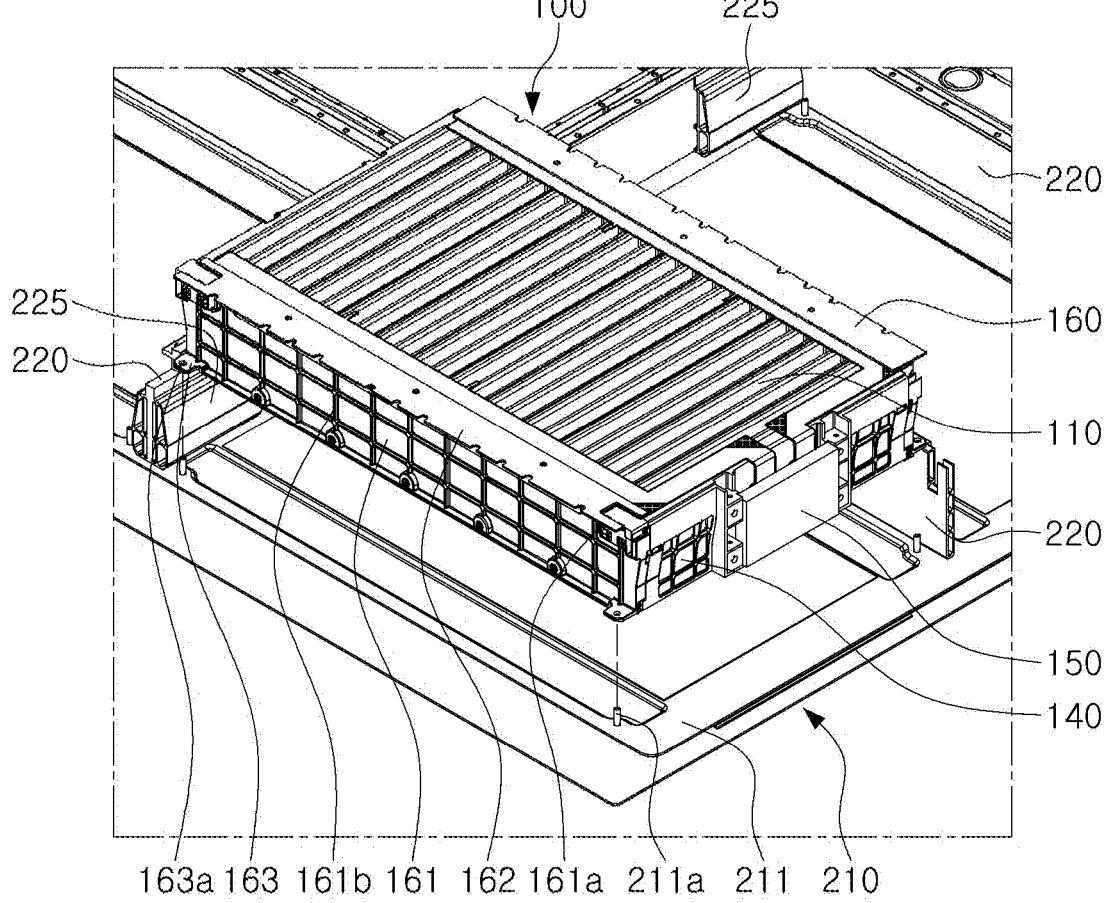
FIG. 5 is a perspective view illustrating a state in which the battery assembly illustrated in FIG. 1 is mounted on a pack housing illustrated in FIG. 4.
Figure 6:
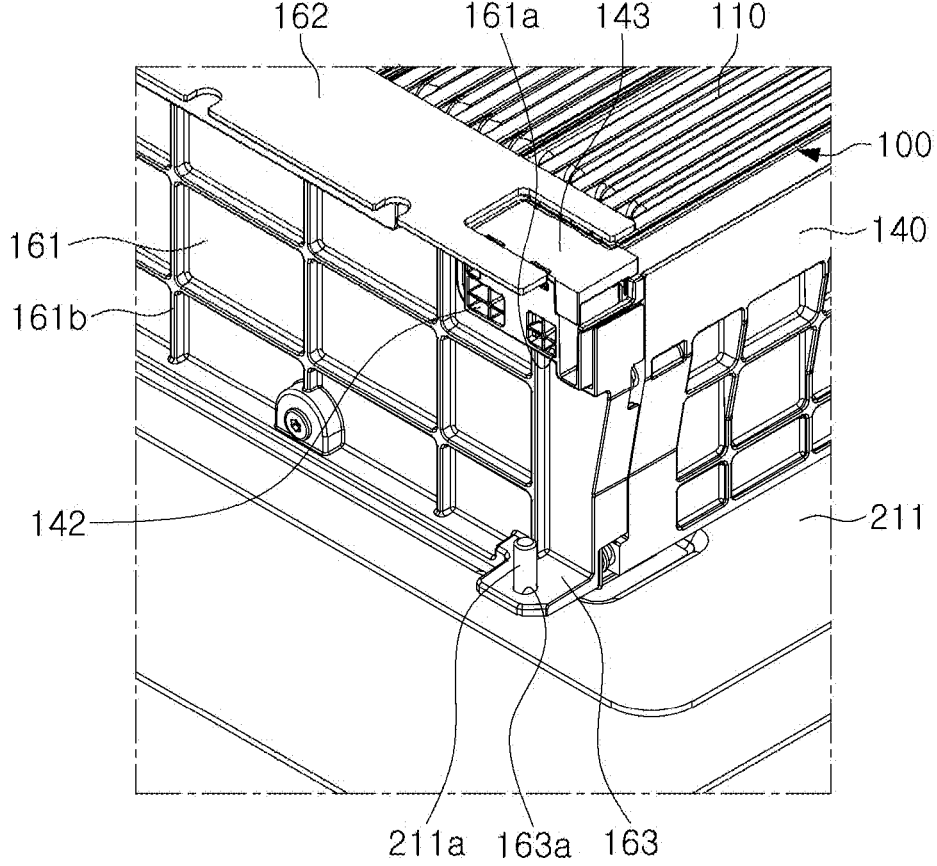
FIG. 6 is an enlarged perspective view illustrating a state in which the battery assembly is mounted on the pack housing in FIG. 5.

FIG. 5 is a perspective view illustrating a state in which the battery assembly 100 illustrated in FIG. 1 is mounted in the pack housing 210 illustrated in FIG. 4, and illustrates a state in which the side wall portion 212 has been removed in order to check the internal structure. FIG. 6 is an enlarged perspective view of the battery assembly 100 mounted in the pack housing 210 in FIG. 5.

Referring to FIGS. 5 and 6, the battery assembly 100 is installed in the space partitioned by the partition member 220 in the vertical direction, and may be fixed to a bottom portion 211 of the pack housing 210 through the bracket member 160. At least a portion of the partition member 220 may be provided with a guide member 225 having a narrow upper side and a wide lower side to guide the movement of the battery assembly 100 in the downward direction.

The bracket member 160 may include a support plate 161 formed of a wide surface facing the plate unit 140, an upper flange portion 162 provided on the upper end of the support plate 161, and a lower flange portion 163 provided on the lower end of the support plate 161. An opening 161a corresponding to the vent hole 142 and/or the terminal connection portion 143 provided in the first plate 141 of FIG. 2 may be formed in the support plate 161. The support plate 161 may include a reinforcing portion 161b having a bead structure to supplement rigidity, and the reinforcing portion 161b may have a lattice shape.

The battery assembly 100 may be installed on the bottom portion 211 of the pack housing 210 through the bracket member 160. In an embodiment, a protruding pin 211a protruding upwardly may be formed on the bottom portion 211, and an insertion hole 163a into which the protruding pin 211a is inserted may be formed in the lower flange portion 163 of the bracket member 160. Since the protruding pin 211a of the bottom portion 211 is inserted into the insertion hole 163 of the lower flange portion 163, adjustment of the installation position of the battery assembly 100 may be facilitated.

Figure 7:
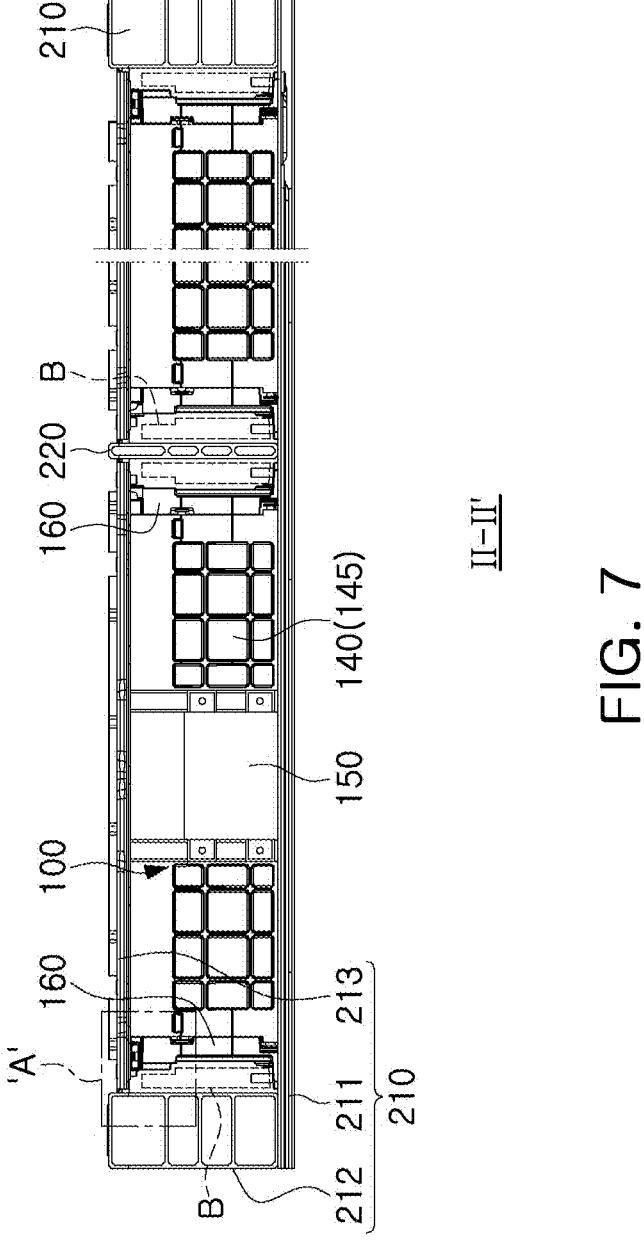
FIG. 7 is a cross-sectional view taken along line of FIG. 4, illustrating a state in which a second sidewall has been removed from a portion corresponding to the battery assembly.
Figure 8:
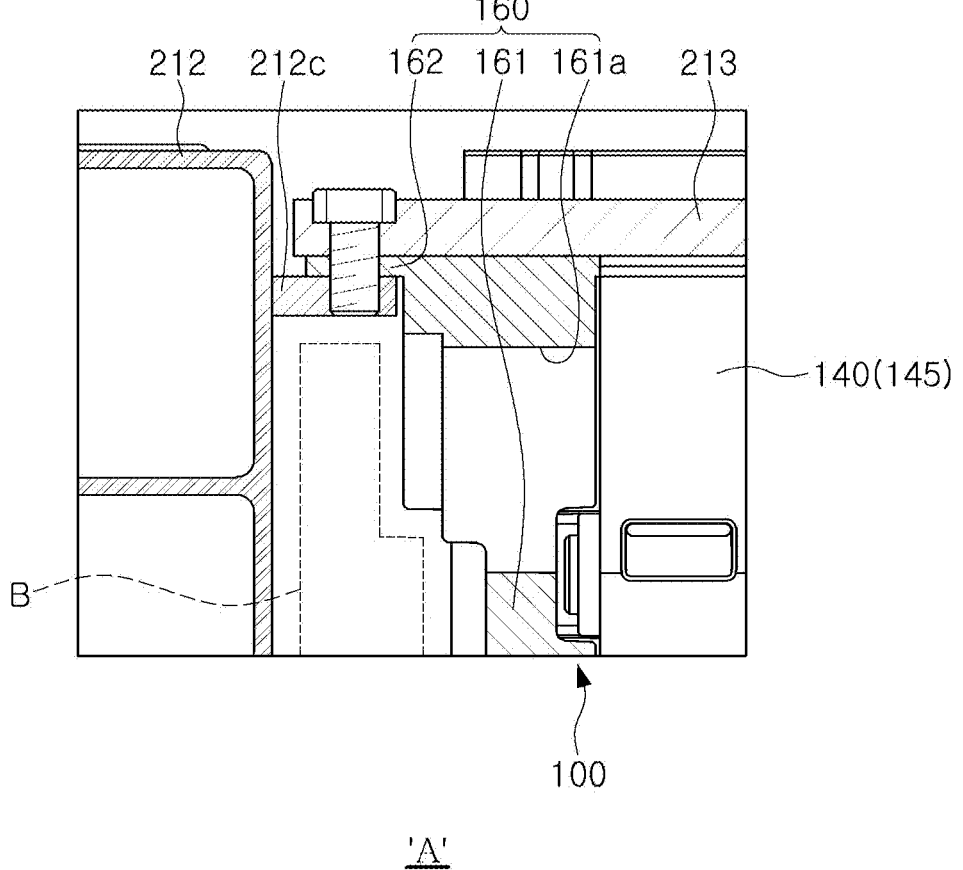
FIG. 8 is an enlarged view of portion "A" of FIG. 7.

FIG. 7 is another cross-sectional view taken along line II-II' of FIG. 4, and illustrates a state in which the second sidewall 212b has been removed from the portion corresponding to the battery assembly 100, and FIG. 8 is an enlarged view of part "A" of FIG. 7. For convenience of description, FIGS. 7 and 8 illustrate a cross-sectional view of the opening 161a of the bracket member 160, corresponding to the vent hole 142.

Referring to FIGS. 7 and 8, the pack housing 210 may include a bottom portion 211, a side wall portion 212 extending upwardly from the bottom portion 211, a cover portion 213 covering the space formed by the bottom portion 211 and the side wall portion 212. A plurality of partition members 220 may be installed between the side wall portions 212.

The battery assembly 100 may be installed in the pack housing 210 through the bracket member 160. In an embodiment, the upper flange portion 162 of the bracket member 160 may be fastened to a flange extension portion 212c formed on the side wall portion 212. In this case, to improve the fixing strength of the battery assembly 100 and to improve the overall assembly characteristics of the battery pack 200, the upper flange portion 162 may be fixed together with the side wall portion 212 and the cover portion 213. In a similar manner, the upper flange portion 162 of the bracket member 160 may be fastened to the partition member 220.

As described with reference to FIGS. 5 and 6, the lower flange portion 163 of the bracket member 160 is fixed by a protruding pin 211a protruding from the bottom portion 211 of the pack housing 210, and the upper flange portion 162 is fixed to the side wall portion 212. Therefore, the battery assembly 100 may be stably fixed to the pack housing 210 through the bracket member 160.

On the other hand, gas, flame, and/or a combustion material discharged from the cell stack 110 is discharged outwardly of the cell stack 110 through the vent hole 142. In this case, between the pack housing 210 and the bracket member 160, a venting space (B) serving as a passage for gas or the like may be formed. In addition, a venting space (B) serving as a path for movement of gas or the like may be formed between the partition member 220 and the bracket member 160. Since the gas discharged to the venting space B may be discharged externally through the vent member 230 after moving through the gas discharge path BP as illustrated in FIG. 4, the rapid propagation of flame/heat may be significantly reduced.

As such, in an embodiment, not only may the battery assembly 100 be easily installed in the pack housing 210 through the bracket member 160, and but also the venting space (B) may be formed between the bracket member 160 and the pack housing 210 as a passage for gas and the like. For example, the bracket member 160 may not only perform a function of mounting the battery assembly 100 in the pack housing 210, but may also simultaneously perform a function of forming a venting space. Accordingly, according to an embodiment, since the configuration for forming the venting space B and the configuration for fixing the battery assembly 100 do not need to be separately installed, space utilization may be increased and energy density of the battery pack 200 may be improved.

As an example, the bracket member 160 may be formed of a material, such as metal, resin, composite, and fiber-reinforced composite, or the like, having heat resistance and fire resistance performance and having stiffness of about 0.5 GPa or more, to secure the rigidity capable of fixing the battery assembly 100 to the pack housing 210 while forming a venting space. In addition, the bracket member 160 may be manufactured through post-processing such as coating, heat treatment, or the like to reinforce heat-resistance and fire-resistance, strength and rigidity.

In the case of this embodiment, since the plate unit 140 has a structure that does not completely cover the lower surface of the cell stack (110 in FIG. 2), a lower surface of the cell stack 110 may contact the bottom portion 211 of the pack housing 210. Accordingly, the heat generated in the battery cell (111 in FIG. 2) may be transferred to the bottom portion 211 of the pack housing 210, and the heat transferred to the bottom portion 211 may be discharged to the outside of the pack housing 210 through a cooling unit (not illustrated) through which coolant flows. In this case, to improve the heat dissipation performance of the battery cell 111, a thermally conductive material such as a thermally conductive adhesive or the like may be interposed between the lower surface of the battery cell 111 and the bottom portion 211.

In addition, in the case of the embodiment, since the plurality of battery cells 111 constituting the cell stack 110 are installed in the pack housing 210 through the plate unit 140 and the bracket member 160, compared to the related art using a battery module, the space utilization inside the battery pack 200 may increase and the energy density of the battery pack 200 may be increased.

FIGS. 9A to 9D are cross-sectional views illustrating various modifications of the bracket member 160 taken along line I-I' of FIG. 2.

Figure 9A:
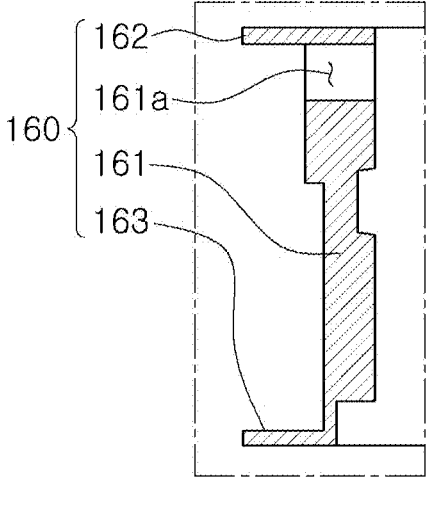
FIGS. 9A to 9D are cross-sectional views illustrating various modifications of a bracket member taken along line I-I' of FIG. 2.

In this case, FIG. 9A illustrates an embodiment of the bracket member 160 having a support plate 161, an upper flange portion 162, and a lower flange portion 163, and the bracket member 160 may have an approximately flattened "U" shape. FIG. 9A may correspond to the cross section of the bracket member 160 illustrated in FIGS. 7 and 8.

Figure 9B:
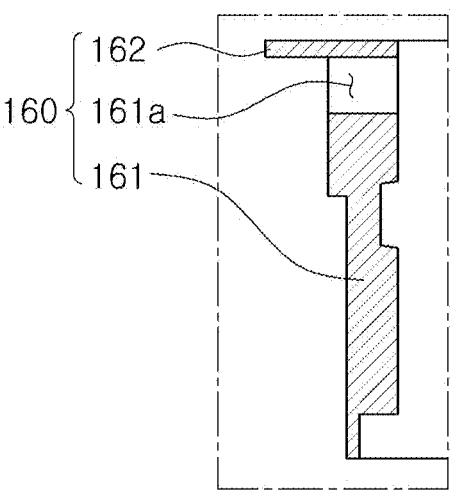

FIG. 9B illustrates an embodiment of the bracket member 160 having the support plate 161 and the upper flange portion 162. The bracket member 160 may have a shape similar to that of an approximately "L" shape rotated. In this case, compared to the case including the lower flange portion 163, the bracket member 160 may be configured to be relatively lighter.

Figure 9C:
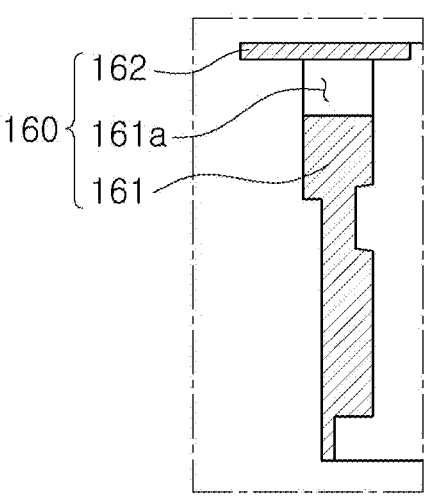

FIG. 9C illustrates an embodiment of the bracket member 160 having a support plate 161 and an upper flange portion 162, and illustrates the upper flange portion 162 extending in the direction of the cell stack 110 to form an approximately "T" shape, compared to the embodiment illustrated in FIG. 9B. In this case, since a portion of the upper surface of the cell stack 110 is supported through the upper flange portion 162, the upper flange portion 162 may have a structure that covers at least a portion of the sensing unit 130. Accordingly, the upper flange portion 162 may perform a function of protecting the sensing unit 130 and preventing the cell stack 110 from being separated in the upper direction.

Figure 9D:
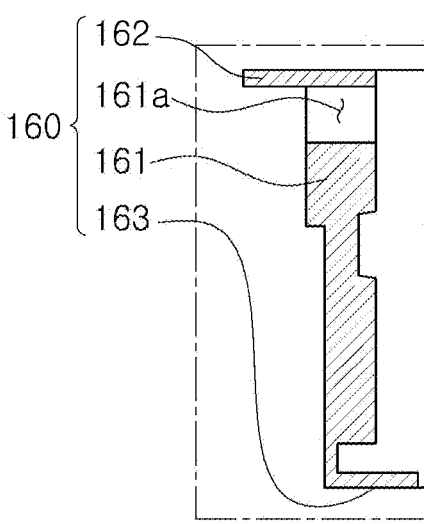

FIG. 9D illustrates an embodiment of the bracket member 160 having a support plate 161, an upper flange portion 162, and a lower flange portion 163. The bracket member 160 has a shape similar to a substantially "Z" shape. Compared to the embodiment illustrated in FIG. 9A, the lower flange portion 163 extends in the direction of the cell stack 110 to support a portion of the lower surface of the cell stack 110. Accordingly, the cell stack 110 may function so as not to be separated in the downward direction, and thus, transport and movement of the battery assembly 100 may be facilitated.

As set forth above, according to an embodiment of the present disclosure with the configuration as described above, the space utilization of the battery pack may increase and the energy density may be improved.

In addition, according to an embodiment, the effect that the sensing member may be easily installed through a simple configuration and insulation between the sensing member and the battery cell may be secured may be obtained.

While this disclosure includes detailed examples, various modifications and variations to the described example embodiments and other embodiments may be made claims based on what is disclosed in the present disclosure.

What is claimed is:

1. A battery assembly comprising:
a cell stack including a plurality of battery cells stacked together;
a busbar assembly coupled to the cell stack and including a busbar electrically connected to an electrode lead of at least one of the battery cells and an insulating support plate on which the busbar is installed;
a plate unit configured to cover the busbar assembly or at least a portion of a side surface of the cell stack;
a sensing unit coupled to the busbar assembly and disposed outside of the cell stack; and
a cell monitoring unit coupled to the sensing unit through a connector of the sensing unit and transmitting information received from the sensing unit to a battery management system,
wherein the cell monitoring unit is installed on an outside of the plate unit.

2. The battery assembly of claim 1, wherein the sensing unit includes a circuit member disposed on one surface of the cell stack, and an insulating member coupled to the circuit member to insulate the circuit member and the cell stack from each other.

3. The battery assembly of claim 2, wherein the circuit member includes a flexible printed circuit board (FPCB), and
the insulating member includes an insulating film or an insulating pad on which the flexible printed circuit board is installed.

4. The battery assembly of claim 2, wherein the sensing unit further includes a sensor installed on an extension portion extending from the circuit member toward the busbar.

5. The battery assembly of claim 4,
wherein an installation groove is disposed in the support plate, and wherein the extension portion passes through the installation groove.

6. The battery assembly of claim 1, wherein at least a portion of the cell stack and the sensing unit is exposed to an outside of the plate unit.

7. The battery assembly of claim 1, wherein the plate unit includes a first plate covering the cell stack in a longitudinal direction of the battery cells, and a second plate covering the cell stack in a stacking direction of the battery cells.

8. The battery assembly of claim 7, wherein the plate unit has a shape that surrounds four side surfaces of the cell stack, wherein at least a portion of an upper surface and at least a portion of a lower surface of the cell stack are exposed externally from the plate unit.

9. The battery assembly of claim 7, wherein the busbar assembly is disposed between the first plate and the cell stack.

10. The battery assembly of claim 9, wherein the battery cell includes a pouch-type secondary battery provided with the electrode lead on both ends of the at least one of the battery cells in the longitudinal direction, and
the busbar assembly is disposed on both ends of the at least one of the battery cells in the longitudinal direction.

11. The battery assembly of claim 1, further comprising a bracket member coupled to an exterior surface of the plate unit.

12. A battery pack comprising:
a pack housing; and
a plurality of battery assemblies accommodated in the pack housing,
wherein at least one of the battery assemblies includes: a cell stack including a plurality of battery cells stacked together; a busbar assembly coupled to the cell stack and including a busbar electrically connected to the battery cell and an insulating support plate on which the busbar is installed; a plate unit configured to cover the busbar assembly or at least a portion of a side surface of the cell stack; a sensing unit coupled to the busbar assembly and disposed outside of the cell stack; a cell monitoring unit coupled to the sensing unit through a connector of the sensing unit and transmitting information received from the sensing unit to a battery management system; and a bracket member coupled to an exterior surface of the plate unit, wherein the battery assembly is fixed to the pack housing by the bracket member, and wherein the cell monitoring unit is installed on an outside of the plate unit.

13. The battery pack of claim 12, wherein the plate unit includes a first plate covering the cell stack in a longitudinal direction of the battery cell, wherein the bracket member is coupled to an exterior surface of the first plate.

14. The battery pack of claim 13, wherein the pack housing includes a bottom portion, a sidewall portion extending upwardly from the bottom portion, and a cover portion covering a space formed by the bottom portion and the sidewall portion, and the bracket member includes a support plate facing the first plate, and an upper flange portion provided on an upper end of the support plate, wherein the upper flange portion is fastened to the side wall portion.

15. The battery pack of claim 14, wherein the bracket member includes a lower flange portion disposed on a lower end of the support plate, wherein the lower flange portion is fixed to the bottom portion of the pack housing.

16. The battery pack of claim 14, wherein the bracket member includes a lower flange portion disposed on a lower end of the support plate, wherein the lower flange portion extends in a direction of the cell stack to support a portion of a lower surface of the cell stack.

\* \* \* \* \*